(No Model.)
A. SCHAER.
YARN NUMBERING SCALE BEAM.
No. 566,872. Patented Sept. 1, 1896.
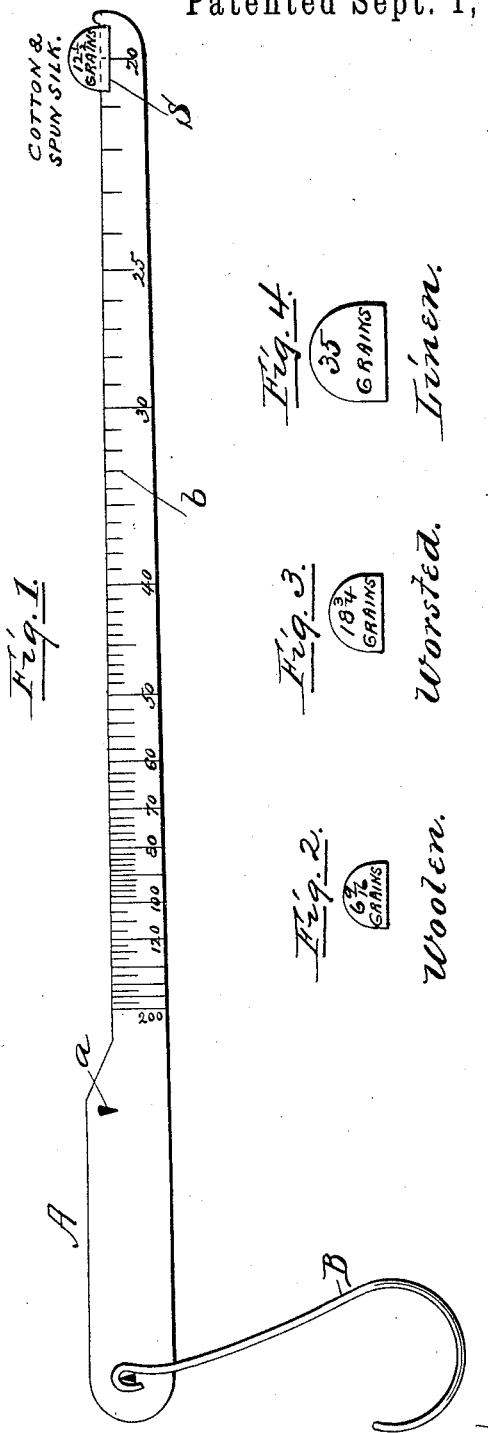
Witnesses.
Charles Hannigan.
James E. Arnold
Inventor.
Arnold Schaer.
By Benj. Arnold
Atty.

UNITED STATES PATENT OFFICE.

ARNOLD SCHAER, OF WARREN, RHODE ISLAND.

YARN-NUMBERING SCALE-BEAM.

SPECIFICATION forming part of Letters Patent No. 566,872, dated September 1, 1896.

Application filed February 13, 1895. Serial No. 538,176. (No model.)

*To all whom it may concern:*

Be it known that I, ARNOLD SCHAER, of Warren, in the county of Bristol and State of Rhode Island, have invented certain new and useful Improvements in Yarn-Numbering Scale-Beams; and I do hereby declare that the following is a full, clear, and exact description thereof, reference being had to the accompanying drawings, and to the letters of reference marked thereon, which form a part of this specification.

This invention relates to apparatus used to find the number or size of yarn for the use of spinners, weavers, and others.

Heretofore the ordinary way of obtaining this number has been to reel off one hundred and twenty yards of the yarn to be numbered, and then weighing this sample on a grain-scale, and, by calculations based on the number of grains the sample weighed, find out the number of the yarn.

My object is to facilitate the operation of finding the number of the yarn and lessen the liability to make mistakes. This is accomplished by graduating the scale-beam for weighing the yarn into divisions so proportioned and numbered that the mark indicated by the sliding pea on the beam will indicate the number of the yarn, so that it can readily be seen at a glance without making any calculation, thereby saving time and avoiding the liability of making mistakes.

In the drawings, Figure 1 represents the scale-beam with its proportional divisions and a pea of the right weight for cotton yarns or for spun silk. Figs. 2, 3, and 4 represent peas of the proper weight to use on the same scale-beam for woolen, worsted, and linen yarns, respectively.

The scale-beam A is preferably made of aluminium, as the lighter it is the more quickly it will turn on its pivot and the more accurate the weight will be.

B is the hook upon which yarn to be weighed is hung. The divisions $b$ on the scale-beam A start from twenty, although they may go down to ten or five for very coarse yarns, and go up to two hundred or higher for very fine yarns, and are so proportioned to each other that if a hank of one hundred and twenty yards of cotton yarn or spun silk is hung on the hook B, and balanced by the pea for those materials, the number indicated by the middle mark on the pea S will be the number of the yarn. Cotton and spun silk are so nearly of the same class-number that the same pea answers for weighing both. For other yarns—as, for example, woolen, worsted, and linen—peas are provided having the same proportional weight to the pea used for cotton and to each other as the class-numbers of those materials have to cotton and each other, which proportions are closely approximated in the following weights:

For cotton, twelve and one-half grains; woolen, six and nine-sixteenths grains; worsted, eighteen and three-fourths grains; linen, thirty-five grains. These weights may all be used on the same proportionally-divided scale-beam with the same length, one hundred and twenty yards, of the different yarns, and the number of each yarn will be the number that the weight or pea indicates when the scale is balanced. By cutting a sample of cloth to a size proportioned to its count of threads or picks per inch, so as to contain one hundred and twenty yards of yarn, it can be weighed on the scale and the number of the yarn in the piece shown, the same as in the case of the yarn above described.

Having thus described my improvements, I claim as my invention and desire to secure by Letters Patent—

A device for ascertaining the size and number of yarn by the weight of a given length, consisting of a single beam having a hook pivotally suspended from one end to carry a hank of yarn, fulcrum-points extending outward from the sides of the beam, a graduated scale on the beam, a stop at each end of said scale, and a series of poises, each poise representing the weight of a given length of yarn of certain material, said poises having each an angular groove in its under side to slide on the beam, and to be readily removable therefrom, the grooves being only of sufficient depth to cover the upper edge of the beam, so as not to obscure the graduation-marks of the scale, substantially as described.

ARNOLD SCHAER.

Witnesses:
BENJ. ARNOLD,
E. B. READ.